US012799820B2

(12) United States Patent
Dong et al.

(10) Patent No.: US 12,799,820 B2
(45) Date of Patent: Nov. 17, 2026

(54) FAST-FOLDING TELESCOPIC LADDER

(71) Applicant: ZHEJIANG AOPENG INDUSTRY AND TRADE CO., LTD, Jinhua (CN)

(72) Inventors: Kaibo Dong, Jinhua (CN); Miaoren Chen, Jinhua (CN); Zhuping Bao, Jinhua (CN); Xupo Lan, Jinhua (CN); Jiandong Xu, Jinhua (CN); Junjie Qiu, Jinhua (CN)

(73) Assignee: ZHEJIANG AOPENG INDUSTRY AND TRADE CO., LTD, Jinhua (CN)

( * ) Notice: Subject to any disclaimer, the term of this patent is extended or adjusted under 35 U.S.C. 154(b) by 431 days.

(21) Appl. No.: 18/110,898

(22) Filed: Feb. 17, 2023

(65) Prior Publication Data

US 2023/0287739 A1 Sep. 14, 2023

(30) Foreign Application Priority Data

Mar. 11, 2022 (CN) ......................... 202220526591.6
Mar. 16, 2022 (CN) ......................... 202220575668.9

(51) Int. Cl.
*E06C 1/22* (2006.01)
*E06C 7/18* (2006.01)

(52) U.S. Cl.
CPC ................ *E06C 1/22* (2013.01); *E06C 7/182* (2013.01)

(58) Field of Classification Search
CPC ... E06C 1/22; E06C 1/125; E06C 7/02; E06C 7/04; E06C 7/06; E06C 7/42; E06C 7/423; E06C 7/44; A47C 12/00; A47C 12/02
USPC .......................................................... 182/212
See application file for complete search history.

(56) References Cited

U.S. PATENT DOCUMENTS 1,169,700 A * 1/1916 Waltower .................. E06C 1/22 182/201
2,010,588 A * 8/1935 Gooden .................. E06C 7/182 182/106
4,989,692 A * 2/1991 Min .......................... E06C 1/39 182/24
5,577,574 A * 11/1996 Joseph ...................... E06C 7/42 182/174

(Continued)

FOREIGN PATENT DOCUMENTS

CN 201502312 U 6/2010
CN 202866628 U 4/2013

(Continued)

*Primary Examiner* — Noah C. Hawk

(57) ABSTRACT

The present invention discloses a fast-folding telescopic ladder. The telescopic ladder body includes telescopic ladder rods, pedals, hinges, and buttons provided at ends of bottom surfaces of the pedals and used for releasing a locked state between corresponding sleeve rods when pressed. A top end of one of the telescopic ladder rods is fixed with a handrail rod. An extension part includes a plurality of bottom tubes that are respectively socketed and matched with bottom ends of the telescopic ladder rods; and a transverse connecting piece, two ends of which are respectively socketed and matched with top ends of the paired bottom tubes. A driving mechanism that realizes the vertical movement of the linkage rod by pedaling is arranged between the bottoms of the two paired bottom tubes. This solves the problem of inconvenient operation when folding a telescopic ladder.

11 Claims, 11 Drawing Sheets

(56) References Cited

U.S. PATENT DOCUMENTS

| | | | | |
|---|---|---|---|---|
| 7,316,293 | B2 * | 1/2008 | Yao | E06C 1/125 182/195 |
| 8,056,679 | B2 * | 11/2011 | Hong | E06C 1/12 182/195 |
| 8,066,099 | B2 * | 11/2011 | Liang | E06C 1/125 182/195 |
| 10,697,238 | B2 * | 6/2020 | Era | E06C 7/06 |
| 2007/0295556 | A1 * | 12/2007 | Grinberg | E06C 7/44 182/201 |
| 2009/0065304 | A1 * | 3/2009 | Jian | E06C 1/125 182/209 |
| 2010/0133041 | A1 * | 6/2010 | Wang | E06C 7/42 182/178.3 |

FOREIGN PATENT DOCUMENTS

| | | | | |
|---|---|---|---|---|
| CN | 203161060 | U | 8/2013 | |
| DE | 19530452 | A1 * | 2/1997 | E06C 1/125 |

* cited by examiner

FAST-FOLDING TELESCOPIC LADDER

CROSS-REFERENCE TO RELATED APPLICATION

This application claims the benefit of Chinese Patent Application No. 202220526591.6 filed on Mar. 11, 2022 and Chinese Patent Application No. 202220575668.9 filed on Mar. 16, 2022, the contents of which are incorporated herein by reference.

TECHNICAL FIELD

The present invention relates to the technical field of telescopic ladders, and in particular to a fast-folding telescopic ladder.

BACKGROUND ART

Telescopic ladders are ladders that can be stretched and shortened like fishing rods, which can be divided into two types: engineering telescopic ladders and bamboo-joint type telescopic ladders. It is very convenient to carry and store, and can be placed in a closet, in a study room, under a bed at home, or in a trunk of a car.

In the prior art, most telescopic ladders are provided with a one-key folding structure, and a button is provided on a lower end surface of each step of pedal. When the button on a lower step of pedal is pressed, a locking structure thereon will be released, and an upper step of ladder tube descends with an upper step of pedal descending together to contact the lower step of pedal, and at this time, the button at the bottom of the upper step of pedal is pressed, such that the further upper step of ladder tube descends, and so on, so as to complete the folding of the entire ladder. For example, the Chinese patent entitled "TELESCOPIC LADDER" and granted a publication No. CN202866628U, the Chinese patent entitled "TELESCOPIC LADDER" and granted a publication No. CN203161060U, and the Chinese patent entitled "IMPROVED TELESCOPIC LADDER WITH STABLE FOLDING" and granted a publication No. CN201502312U, all adopt a similar structure.

However, this one-key folding structure in the prior art requires an operator to bend down to press the button at the bottom of the lowest step of pedal when folding the ladder, which makes the folding process inconvenient.

Therefore, the present invention proposes a technical solution aimed at solving the problem of inconvenient folding of the telescopic ladder.

Based on the cited prior art references (CN202866628U, CN203161060U, and CN201502312U), the structure and operation of the button assembly used to lock and unlock telescopic ladder sections are well-established and can be summarized as follows. These references demonstrate that the skilled artisan possesses sufficient knowledge to implement a button mechanism for releasing locked states between sleeve rods without undue experimentation.

CN203161060U discloses a locking and release mechanism where a controller (B-2) acts as the functional equivalent of a "button." The controller is partially located inside the pedal and partially exposed externally. It is pressed downward under the force of a spring (C-1). The controller features inclined chutes within its grooves. When the controller is pressed upward (against the spring force) by an external force—such as contact with a lower pedal during collapse—the inclined chutes interact with circular protrusions on a locking pin (C-2). This interaction converts the vertical movement of the controller into a horizontal retraction of the locking pin, disengaging it from the locking hole in the upper ladder rod and unlocking the stages. This illustrates a mechanism where an actuating member (controller/button), when pressed, directly causes the retraction of a locking pin to unlock telescopic sections.

CN201502312U describes a locking device composed of a positioning pin (7), a spring (8), and a switch (9). The switch (9) serves the function of the "button." Pressing the switch (9) upward pushes the positioning pin (7) backward against the spring force, retracting it from the ladder stile and allowing the sections to slide. A specially shaped pad (10) with a protrusion (11) is added to the lower pedal to ensure that when the ladder collapses, the pad presses the switch (9) of the upper stage sufficiently to guarantee full retraction of the pin, preventing friction and jamming. This demonstrates a clear button (switch) mechanism where manual or automatic actuation releases the lock between telescoping members, and the art teaches optimization for reliable operation.

CN202866628U details a mechanism where an unlocking switch (7) is connected to a locking pin (4). The switch is actuated by a vertical transmission rod (8), the bottom end of which is enclosed within a protective sleeve (9). During collapse, a trigger block (6) from the lower connecting sleeve enters the guide hole of the upper sleeve and presses against the bottom of the vertical transmission rod. This pushes the rod upward, which in turn pushes the unlocking switch (7), causing the connected pin (4) to retract horizontally and unlock the sections. This shows an alternative implementation where a force applied to a vertically moving actuator rod triggers a switch/button mechanism to retract the locking pin.

The combined teachings from these references provide a clear and enabling disclosure for a person skilled in the art regarding the structure and operation of a "button" mechanism used to release the locked state between telescopic sleeve rods in a ladder. The principles of using a spring-biased actuator, converting vertical motion into horizontal pin retraction via inclined surfaces or levers, and ensuring full retraction for smooth operation are well-established in the art.

SUMMARY OF THE INVENTION

In order to solve the problem of inconvenient operation when folding a telescopic ladder in the prior art, the present invention designs a fast-folding telescopic ladder.

To achieve the above object, the present invention provides the following technical solution: a fast-folding telescopic ladder, comprising a telescopic ladder body and an extension part, wherein the telescopic ladder body comprises: two pairs of telescopic ladder rods that are arranged in parallel and are respectively formed by a plurality of sleeve rods sheathed with each other; pedals with both ends being respectively mounted at top ends of the paired sleeve rods; hinges with two ends being respectively hinged to outer ends of the pedals; and buttons arranged at ends of bottom surfaces of the pedals and used for releasing a locked state between corresponding sleeve rods when pressed, with one of the telescopic ladder rods having a handrail rod fixed at its top end; and the extension part comprises a plurality of bottom tubes that are respectively socketed and matched with bottom ends of the telescopic ladder rods and a transverse connecting piece, two ends of which are respectively socketed and matched with top ends of the paired bottom tubes.

The two ends of the transverse connecting piece are respectively provided with locking linkage parts radially locking the top ends of the bottom tubes and the bottom ends of the telescopic ladder rods, an inner side of the bottom tube is parallel with a linkage rod whose top end is linked with the locking linkage part and whose vertical movement releases a locked state of the locking linkage part, and a driving mechanism that realizes the vertical movement of the linkage rod by pedaling is arranged between the bottoms of the two paired bottom tubes.

Preferably, an inner side of the bottom end of the telescopic ladder rod is provided with an upper insertion hole, and an inner side of the top end of the bottom tube is provided with a lower insertion hole, the transverse connecting piece comprises an upper transverse tube and joints arranged at both ends of the upper transverse tube, the joint comprises a fixing ring fixedly sheathed on the periphery of the top end of the bottom tube, and an insertion block integrally formed with the fixing ring and fixedly connected to both ends of an inner cavity of the upper transverse tube in an insertion manner, the peripheral wall of the fixing ring is provided with a perforation at a position corresponding to the lower insertion hole, the bottom surface of the insertion block is provided with a sliding groove at a position corresponding to the perforation, the locking linkage part comprises a transverse limiting piece which is arranged in the sliding groove and the outer end of which is inserted into and matched with the perforation, the lower insertion hole and the upper insertion hole, and a transmission member which is used for realizing linkage between the linkage rod and the traverse limiting piece.

Preferably, the transverse limiting piece comprises a fixed sleeve, a movable rod, one end of which is slidably fitted in the fixed sleeve, and a bolt fixedly butted to the other end of the movable rod and inserted into and matched with the perforation, the lower insertion hole and the upper insertion hole; a return spring is provided between the movable rod and an inner cavity of the fixed sleeve; the fixed sleeve is fixed at an inner end of the sliding groove; the vertical movement of the linkage rod drives the movable rod to move towards the fixed sleeve through the transmission member and compress the return spring.

Preferably, a middle part of the fixed sleeve is fixedly sheathed with a retaining plate. A retaining slot into which the retaining plate is fixedly caught is provided at a position near an outer end of the sliding groove on a bottom surface of the insertion block.

Preferably, the extension part further comprises a connecting tube with two ends being respectively fixedly connected to the paired bottom tubes and located below the transverse connecting piece in parallel, and protective shells fixed on inner sides of the bottom tubes with top and bottom ends of the protective shells being respectively connected to ends of the transverse connecting piece and the connecting tube; the protective shells comprise shields fixed to ends of a bottom surface of the transverse connecting piece, and protective barrels fixed to the bottoms of the shields and connected to ends of a top surface of the connecting tube at bottoms; top ends of the linkage rods are located in the shields; and parts between two ends of the linkage rods are sheathed in the protective barrels.

Preferably, bottom ends of two paired linkage rods penetrate through the connecting tube and then are jointly fixed with a downward-pressing lever; the movable rod is fixedly sheathed with a force-receiving piece at a position near the bolt; the transmission member comprises a rotary retaining groove that is movably caught into the sliding groove and has front and rear walls at its outer end which are hinged, through a rotating shaft, to a position near an outer end of the sliding groove, a pressing block fixed to front and rear walls at an outer end of an inner cavity of the rotary retaining groove and movably caught at a position of the movable rod near an outer side of the force-receiving piece, and a connecting ring connected at an inner end of the rotary retaining groove and connected to the top end of the linkage rod; and an inclined strut is fixed between a bottom surface of the connecting tube and the inner side of a corresponding bottom tube.

Preferably, bottom ends of two paired linkage rods penetrate through the connecting tube and then are jointly fixed with a downward-pressing lever; the movable rod is fixedly sheathed with a force-receiving piece at a position near the bolt; the transmission member comprises a pushing vertical plate whose bottom end is connected to the top end of the linkage rod and whose top middle position is movably, connected to the movable rod in a vertical direction, and a pressing block integrally formed on front and rear sides of an inner side wall of a top end of the pushing vertical plate; an outer side of the force-receiving piece is provided with an inclined surface whose normal line is inclined upward; the pressing block is provided with a corresponding inclined surface structure at a position corresponding to the inclined surface of the force-receiving piece; and an inclined strut is fixed between a bottom surface of the connecting tube and the inner side of a corresponding bottom tube.

Preferably, bottom ends of two paired linkage rods penetrate through the connecting tube and then are jointly fixed with a downward-pressing lever; a pulling pole is fixedly butted at the center of an inner end face of the movable rod; the transmission member comprises a wheel seat fixed to a bottom surface of the inner cavity of the upper transverse tube near an end position, a fixed pulley rotatably mounted on the wheel seat, a pulling cable wound around an inner side of the fixed pulley and whose top end is connected to the pulling pole, and a connecting ring connected to a bottom end of the pulling cable and connected to the top end of the linkage rod; and an inclined strut is fixed between a bottom surface of the connecting tube and the inner side of a corresponding bottom tube.

Preferably, end-connecting pieces are respectively fixed at positions below ends of the connecting tube inside the bottom tubes; a bottom transverse tube is fixed between bottom ends of corresponding end-connecting pieces in a horizontal direction; a middle part of a top surface of the bottom transverse tube is vertically and slidably sleeved with a downward-pressing block; a force-receiving plate is fixed on a top end of the downward-pressing block; a vertical spring is connected between a bottom surface of an inner cavity of the bottom transverse tube and a bottom surface of the downward-pressing block; two sides at the bottom of the downward-pressing block are movably connected with swing rods, respectively; front and rear walls at outer ends of the swing rods are respectively rotatably connected to front and rear walls at outer ends of the inner cavity of the bottom transverse tube through rotating shafts; the linkage rods are provided with bending parts at bottoms of inner cavities of the shields and bottom ends of the linkage rods vertically penetrate into inner cavities of the end-connecting pieces at the bottoms; shifting blocks are respectively fixed at positions below the bottom ends of the linkage rods on outer end faces of the swing rods; the movable rod is fixedly sheathed with a force-receiving piece at a position near the bolt; the transmission member comprises a pushing vertical plate whose bottom end is connected to the top end of the linkage rod and whose top middle position is vertically caught with the movable rod, and a pressing block integrally formed at a top end of the pushing vertical plate; the outer side of the force-receiving piece is provided with an inclined surface whose normal line is inclined downward; and the pressing block is provided with a corresponding inclined surface structure at a position corresponding to the inclined surface of the force-receiving piece.

Preferably, end-connecting pieces are respectively fixed at positions below ends of the connecting tube inside the bottom tubes; a bottom transverse tube is fixed between bottom ends of corresponding end-connecting pieces in a horizontal direction; a middle part of a top surface of the bottom transverse tube is vertically and slidably sleeved with a downward-pressing block; a force-receiving plate is fixed on a top end of the downward-pressing block; a vertical spring is connected between a bottom surface of an inner cavity of the bottom transverse tube and a bottom surface of the downward-pressing block; two sides at the bottom of the downward-pressing block are movably connected with swing rods, respectively; front and rear walls at outer ends of the swing rods are respectively rotatably connected to front and rear walls at outer ends of an inner cavity of the bottom transverse tube through rotating shafts; the linkage rods are provided with bending parts at bottoms of inner cavities of the shields and bottom ends of the linkage rods vertically penetrate into inner cavities of the end-connecting pieces at the bottoms; shifting blocks are respectively fixed at positions below the bottom ends of the linkage rods on outer end faces of the swing rods; the movable rod is fixedly sheathed with a force-receiving piece at a position near the bolt; the transmission member comprises a pushing vertical plate whose bottom end is connected to the top end of the linkage rod, a rotating plate, an outer end of a bottom surface of which is vertically and fixedly connected to a top end of the pushing vertical plate, and a pressing block that is fixed at an inner end of a top surface of the rotating plate and whose top end is caught at a position of the movable rod near an outer side of the force-receiving piece; and front and rear walls at inner ends of the rotating plate are respectively mounted on front and rear sides of the sliding groove near the middle position through rotating shafts.

Compared with the prior art, the beneficial effects of the present invention are as follows:

The present invention relates to fast-folding telescopic ladder, which can realize releasing of a locked state between a telescopic ladder body and an extension part only by means of pedaling, so that telescopic ladder rods of the telescopic ladder body fall by their own weights and are sleeved in bottom tubes, and when sleeve rods at the lowest level are completely sleeved in the bottom tubes, buttons fall on a top surface of a transverse connecting piece, so that the buttons are pressed, and then a continuous folding process of the telescopic ladder body is gradually realized. In the whole folding process of the telescopic ladder, a user does not need to bend down and press the buttons, so the folding process is more convenient and easy to operate.

Figure 1:
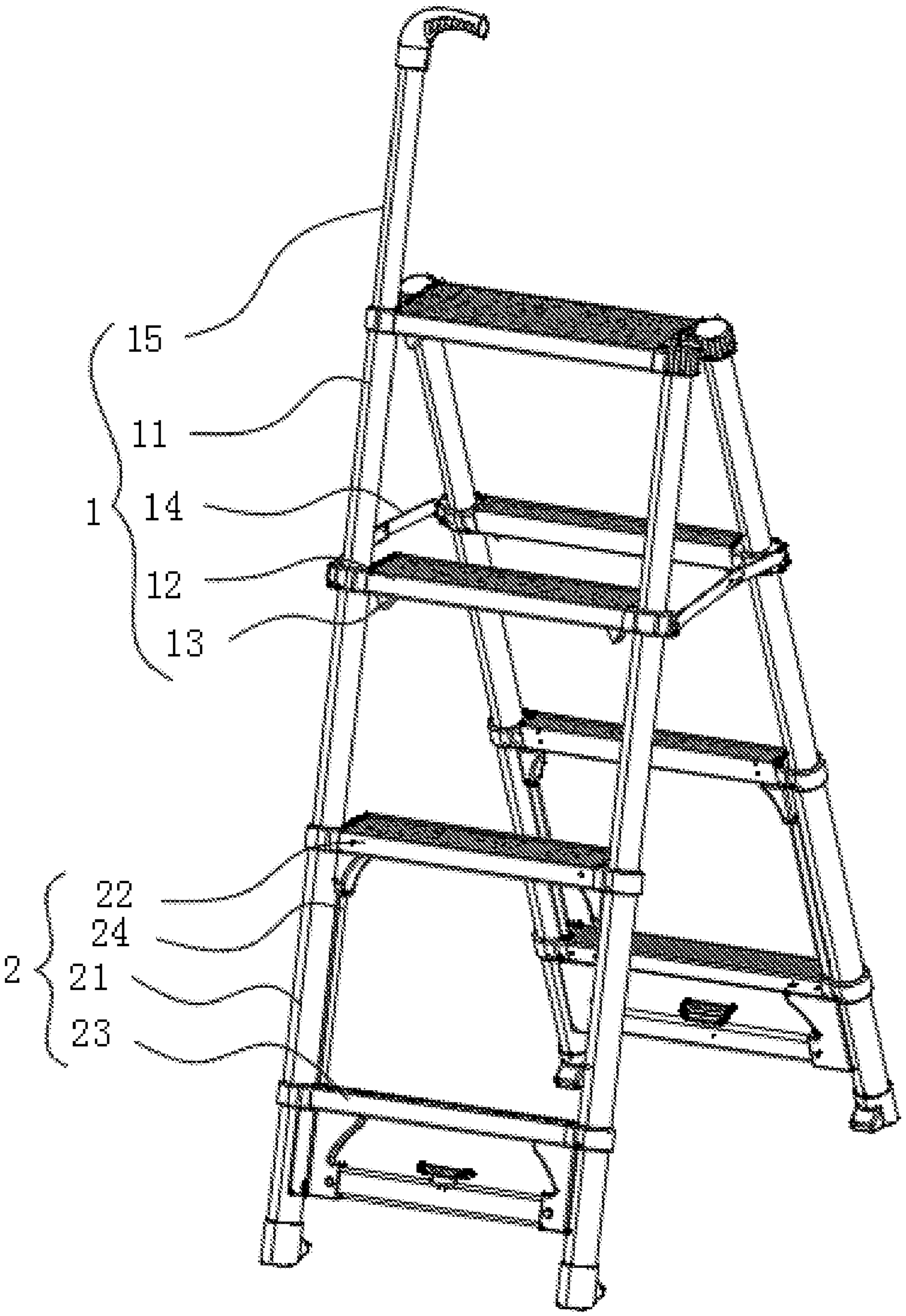
FIG. 1 is a schematic diagram of an overall three-dimensional structure in the present invention.
Figure 2:
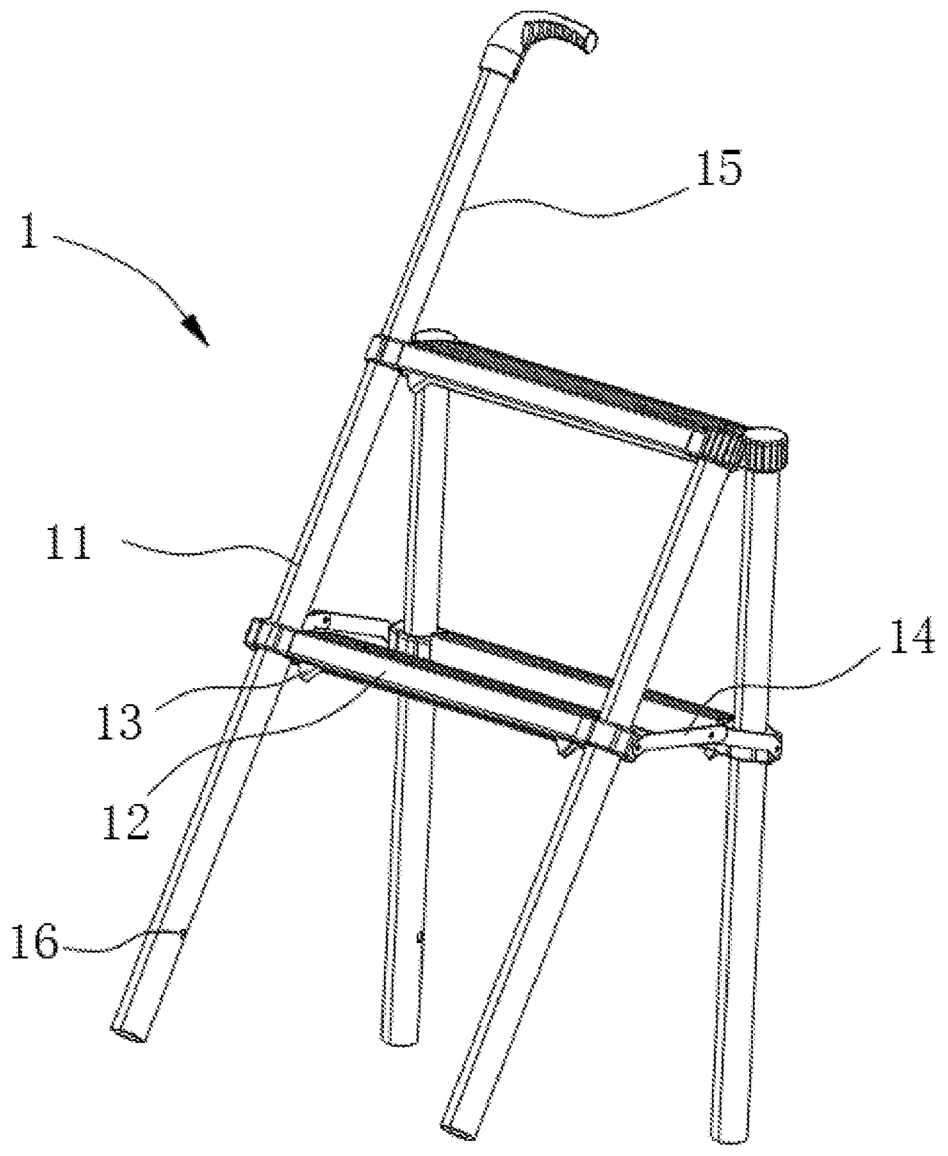
FIG. 2 is a schematic diagram of a three-dimensional structure of a telescopic ladder body in the present invention.
Figure 3:
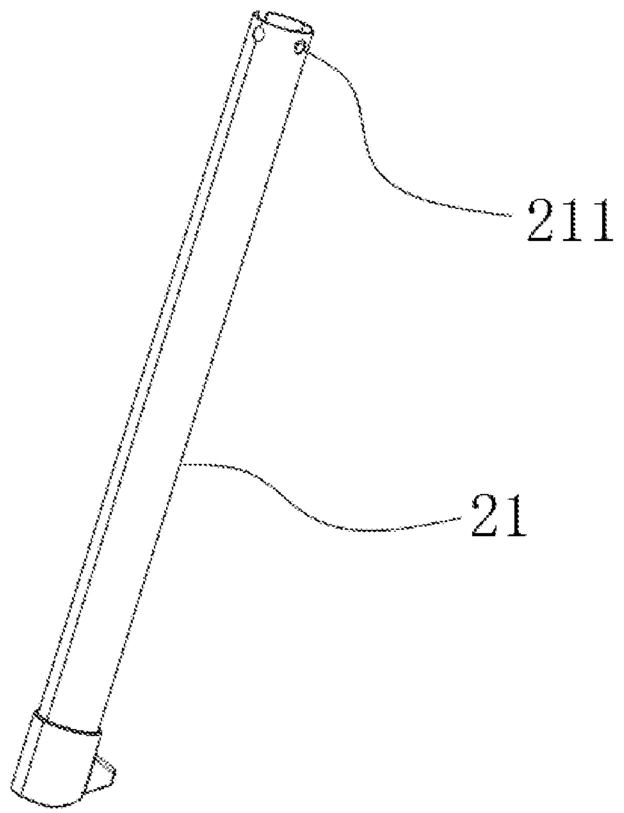
FIG. 3 is a schematic diagram of a three-dimensional structure of a bottom tube in the present invention.
Figure 4:
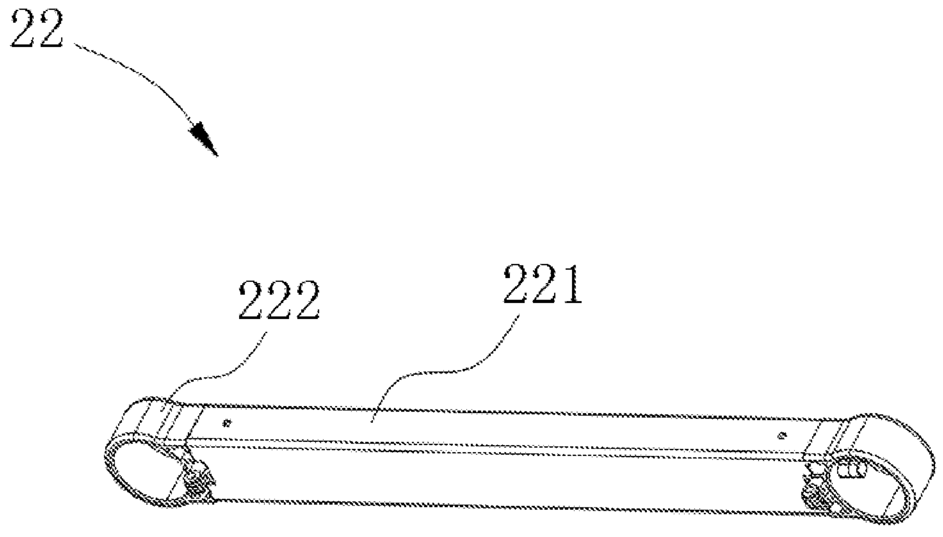
FIG. 4 is a schematic diagram of a three-dimensional structure of a transverse connecting piece in the present invention.
Figure 5:
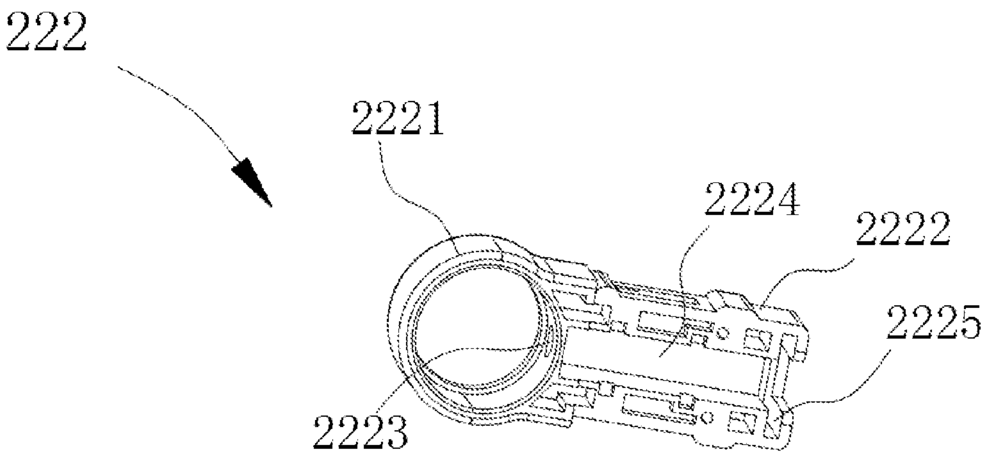
FIG. 5 is a schematic diagram of a three-dimensional structure of a joint in the present invention.
Figure 6:
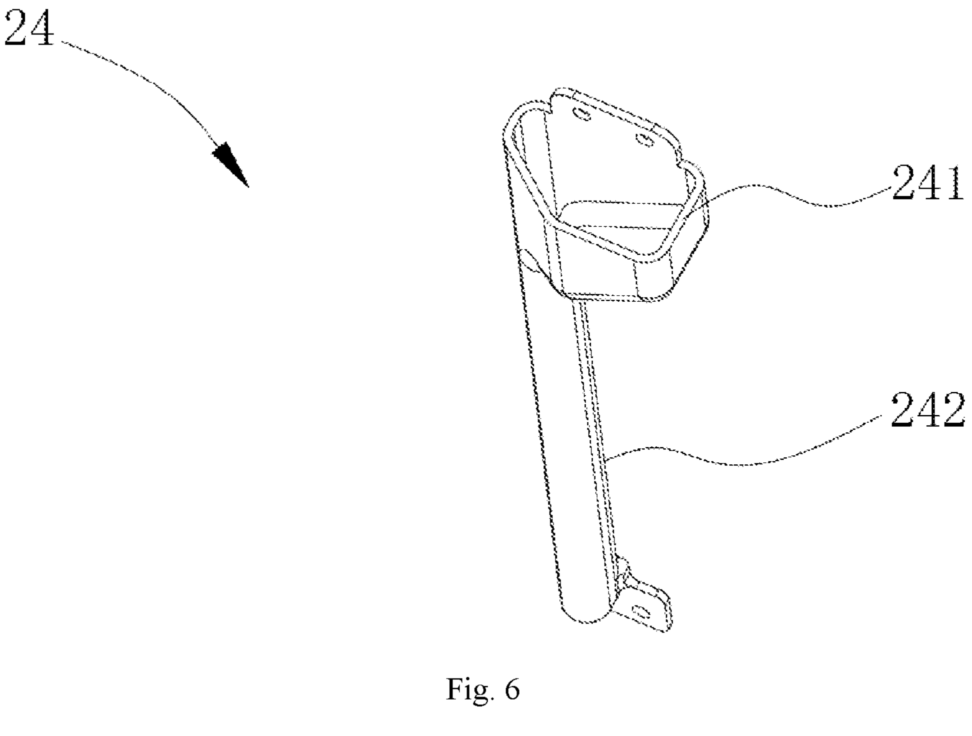
FIG. 6 is a schematic diagram of a three-dimensional structure of a protective shell in the present invention.
Figure 7:
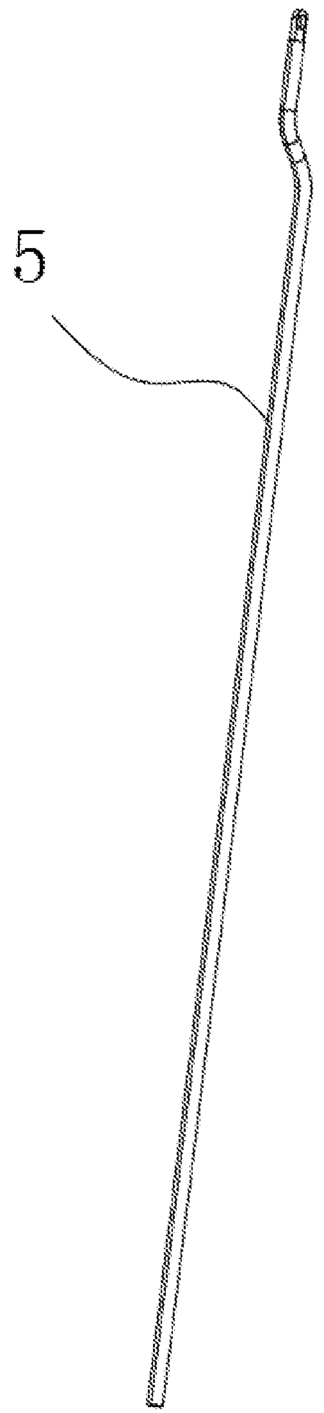
FIG. 7 is a schematic diagram of a three-dimensional structure of a linkage rod in the present invention.
Figure 8:
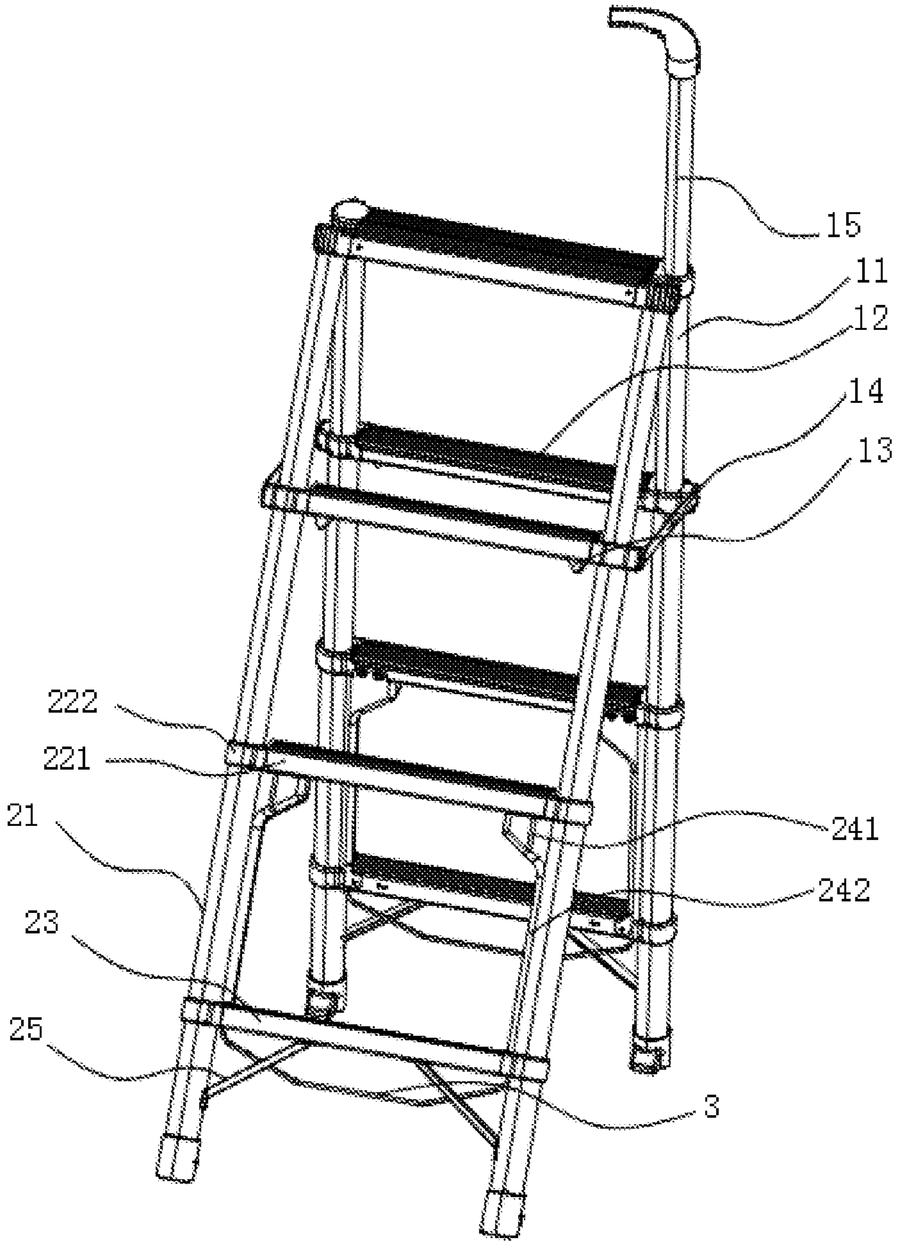
FIG. 8 is a schematic diagram of an overall three-dimensional structure in Embodiment I of the present invention.

In the figures: 1—telescopic ladder body; 11—telescopic ladder rod; 12—pedal; 13—button; 14—hinge piece; 15—handrail rod; 16—upper insertion hole;

- 2—extension part; 21—bottom tube; 211—lower insertion hole; 22—transverse connecting piece; 221—upper transverse tube; 222—joint; 2221—fixing ring; 2222—insertion block; 2223—perforation; 2224—sliding groove; 2225—retaining slot; 23—connecting tube; 24—protective shell; 241—shield; 242—protective barrel; 25—inclined strut; 26—bottom transverse tube; 27—end-connecting piece;
- 3—downward-pressing lever;
- 4—downward-pressing block; 41—force-receiving plate; 42—vertical spring; 43—swing rod; 44—shifting block;
- 5—linkage rod;
- 6—transverse limiting piece; 61—fixed sleeve; 62—retaining plate; 63—movable rod; 64—bolt; 65—force-receiving piece; 66—pulling pole;
- 7—transmission member; 71—rotary retaining groove; 72—pressing block; 73—connecting ring; 74—pushing vertical plate; 75—wheel seat; 76—fixed pulley; 77—pulling cable; 78—rotating plate.

DETAILED DESCRIPTION OF EMBODIMENTS

The technical solution in the embodiments of the present invention will be clearly and completely described below in conjunction with the accompanying drawings for the embodiments of the present invention; and obviously, the embodiments described are merely some, rather than all, of the embodiments of the present invention. On the basis of the embodiments of the present invention, all other embodiments obtained by those of ordinary skill in the art without creative efforts shall fall within the scope of protection of the present invention.

In Embodiment I, referring to FIGS. 1-8, the present invention provides a technical solution, i.e., a fast-folding telescopic ladder, including: a telescopic ladder body 1. The telescopic ladder body 1 includes: two pairs of telescopic ladder rods 11 that are arranged in parallel and are respectively formed by a plurality of sleeve rods sheathed with each other; pedals 12 with both ends being respectively mounted at top ends of the paired sleeve rods; hinges 14 with two ends being respectively hinged to outer ends of the pedals 12; and buttons 13 provided at ends of bottom surfaces of the pedals 12 and used for releasing a locked state between corresponding sleeve rods when pressed. A top end of one of the telescopic ladder rods 11 is fixed with a handrail rod 15.

The extension part 2 includes a plurality of bottom tubes 21 that are respectively socketed and matched with bottom ends of the telescopic ladder rods 11; and a transverse connecting piece 22, two ends of which are respectively socketed and matched with top ends of the paired bottom tubes 21.

Two ends of the transverse connecting piece 22 are respectively provided with locking linkage parts radially locking the top ends of the bottom tubes 21 and the bottom ends of the telescopic ladder rods 11. The inner side of the bottom tube 21 is parallel with a linkage rod 5 whose top end is linked with the locking linkage part and whose vertical movement releases a locked state of the locking linkage part. A driving mechanism that realizes the vertical movement of the linkage rod 5 by pedaling is arranged between the bottoms of the two paired bottom tubes 21.

The inner side of the bottom end of the telescopic ladder rod 11 is provided with an upper insertion hole 16, and the inner side of the top end of the bottom tube 21 is provided with a lower insertion hole 211. The transverse connecting piece 22 includes an upper transverse tube 221 and joints 222 arranged at both ends of the upper transverse tube 221. The joint 222 includes a fixing ring 2221 fixedly sheathed on the periphery of the top end of the bottom tube 21, and an insertion block 2222 integrally formed with the fixing ring 2221 and fixedly connected to both ends of an inner cavity of the upper transverse tube 221 in an insertion manner. The peripheral wall of the fixing ring 2221 is provided with a perforation 2223 at a position corresponding to the lower insertion hole 211. The bottom surface of the insertion block 2222 is provided with a sliding groove 2224 at a position corresponding to the perforation 2223. The locking linkage part includes a transverse limiting piece 6 which is arranged in the sliding groove 2224 and the outer end of which is inserted into and matched with the perforation 2223, the lower insertion hole 211 and the upper insertion hole 16, and a transmission member 7 which is used for realizing linkage between the linkage rod 5 and the traverse limiting piece 6.

The transverse limiting piece 6 includes a fixed sleeve 61, a movable rod 63, one end of which is slidably fitted in the fixed sleeve 61, and a bolt 64 fixedly butted to the other end of the movable rod 63 and inserted into and matched with the perforation 2223, the lower insertion hole 211 and the upper insertion hole 16. A return spring is provided between the movable rod 63 and the inner cavity of the fixed sleeve 61. The fixed sleeve 61 is fixed at the inner end of the sliding groove 2224. The vertical movement of the linkage rod 5 drives the movable rod 63 to move towards the fixed sleeve 61 through the transmission member 7 and compress the return spring.

A middle part of the fixed sleeve 61 is fixedly sheathed with a retaining plate 62. A retaining slot 2225 into which the retaining plate 62 is fixedly caught is provided at a position near an outer end of the sliding groove 2224 on a bottom surface of the insertion block 2222.

The extension part 2 further includes a connecting tube 23 with two ends being respectively fixedly connected to the paired bottom tubes 21 and located below the transverse connecting piece 22 in parallel, and protective shells 24 fixed on the inner sides of the bottom tubes 21 with the top and bottom ends of the protective shells 24 being respectively connected to ends of the transverse connecting piece 22 and the connecting tube 23. The protective shells 24 include shields 241 fixed to ends of the bottom surface of the transverse connecting piece 22, and protective barrels 242 fixed to the bottoms of the shields 241 and connected to ends of the top surface of the connecting tube 23 at bottoms. Top ends of the linkage rods 5 are located in the shields 241, and parts between two ends of the linkage rods 5 are sheathed in the protective barrels 242.

In this embodiment, on the basis of the above content, there are implementations of three different specific forms of locking linkage parts that can be selected.

Figure 9:
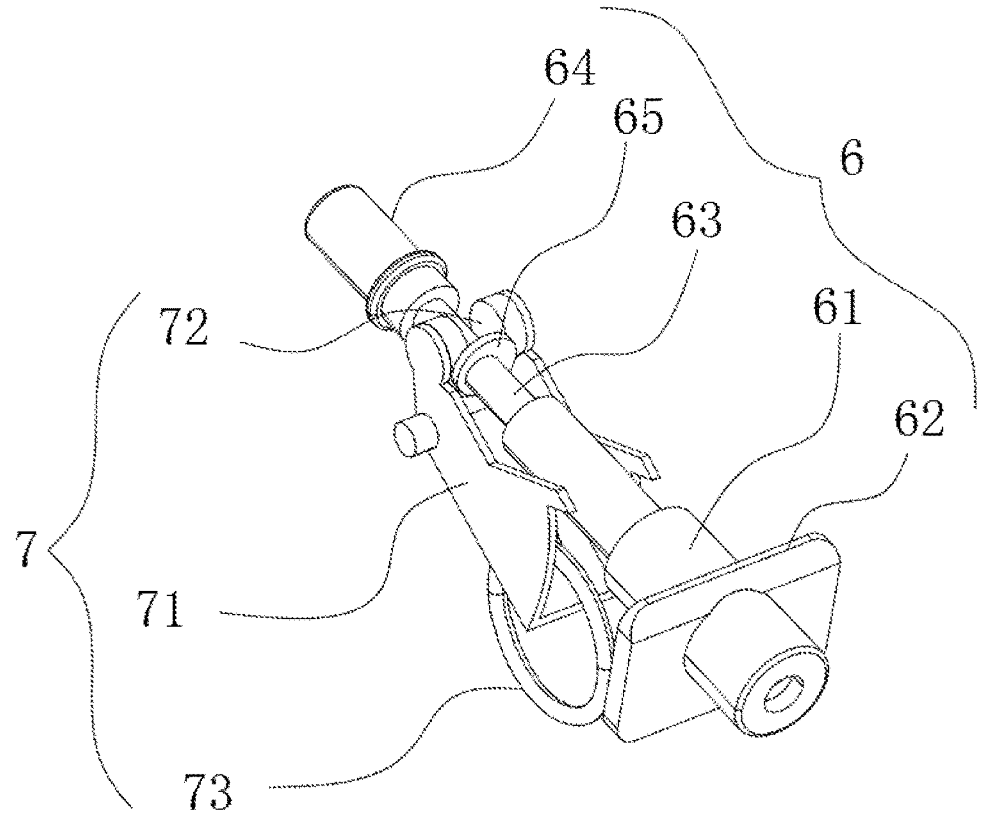
FIG. 9 is a schematic diagram of a three-dimensional structure of a locking linkage part of a first type in Embodiment I of the present invention.

Further referring to FIG. 9, a first specific implementation of the locking linkage part is as follows: bottom ends of two paired linkage rods 5 penetrate through the connecting tube 23 and then are jointly fixed with a downward-pressing lever 3; the movable rod 63 is fixedly sheathed with a force-receiving piece 65 at a position near the bolt 64; the transmission member 7 includes a rotary retaining groove 71 that is movably caught into the sliding groove 2224 and has front and rear walls at its outer end which are hinged, through a rotating shaft, to a position near an outer end of the sliding groove 2224, a pressing block 72 fixed to front and rear walls at an outer end of an inner cavity of the rotary retaining groove 71 and movably caught at a position of the movable rod 63 near an outer side of the force-receiving piece 65, and a connecting ring 73 connected at an inner end of the rotary retaining groove 71 and connected to the top end of the linkage rod 5; and an inclined strut 25 is fixed between a bottom surface of the connecting tube 23 and the inner side of a corresponding bottom tube 21.

To sum up, when the telescopic ladder needs to be folded, a foot is stepped on the downward-pressing lever 3, so that the downward-pressing lever 3 pulls the linkage rods 5 downward, and the linkage rods 5 pull, through the connecting rings 73, the rotary retaining grooves 71 to rotate, such that the pressing blocks 72 swing towards the force-receiving pieces 65, thereby exerting pressures on the force-receiving pieces 65, so that the movable rods 63 move towards the fixed sleeves 61 and compress the return springs. The movable rods 63 drive the bolts 64 to disengage from the upper insertion holes 16, so that the telescopic ladder rods 11 are sheathed in the bottom tubes 21 under the action of their own weights. When the bottommost sleeve rods of the telescopic ladder rods 11 are completely sheathed in the bottom tubes 21, the bottommost buttons 13 just press against the top surfaces of the upper transverse tubes 221, so that the locked state between the bottommost sleeve rods and the secondary bottom sleeve rods is released, and the secondary bottom sleeve rods are completely sheathed in the bottommost sleeve rods, and then the secondary bottom buttons 13 are triggered, and so on, until the automatic folding of the telescopic ladder body 1 is completed.

Figure 10:
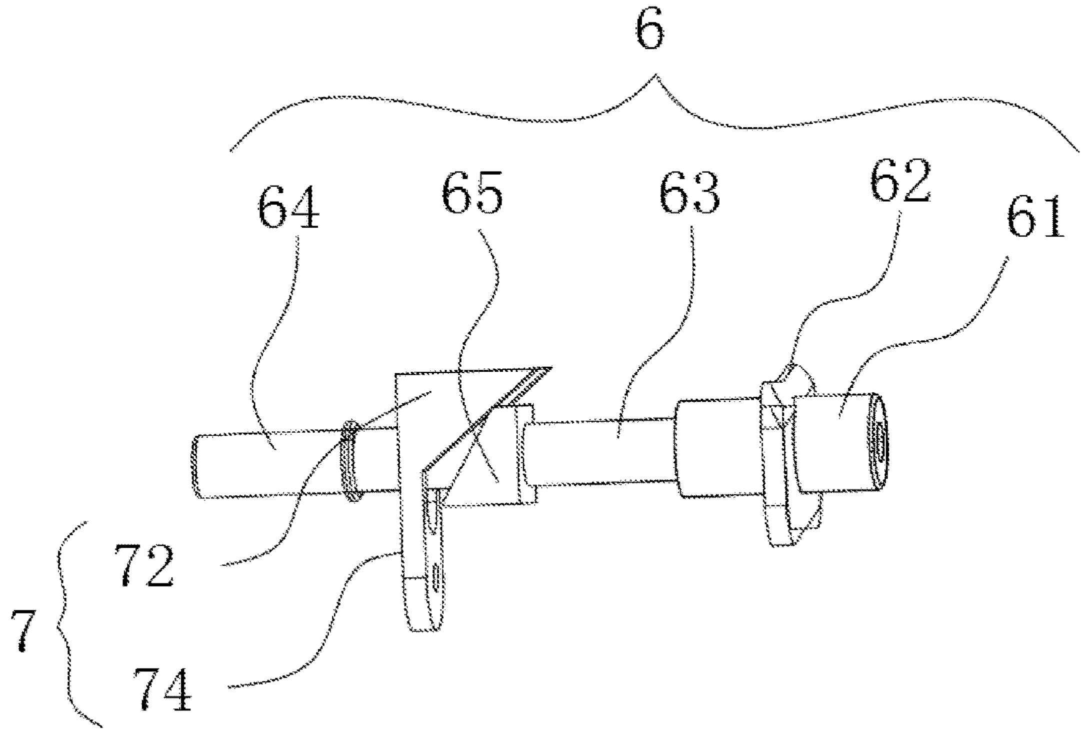
FIG. 10 is a schematic diagram of a three-dimensional structure of a locking linkage part of a second type in Embodiment I of the present invention.

Further referring to FIG. 10, a second specific implementation of the locking linkage part is as follows: bottom ends of two paired linkage rods 5 penetrate through the connecting tube 23 and then are jointly fixed with a downward-pressing lever 3; the movable rod 63 is fixedly sheathed with a force-receiving piece 65 at a position near the bolt 64; the transmission member 7 includes a pushing vertical plate 74 whose bottom end is connected to the top end of the linkage rod 5 and whose top middle position is movably, connected to the movable rod 63 in a vertical direction, and a pressing block 72 integrally formed on front and rear sides of an inner side wall of a top end of the pushing vertical plate 74; an outer side of the force-receiving piece 65 is provided with an inclined surface whose normal line is inclined upward; the pressing block 72 is provided with a corresponding inclined surface structure at a position corresponding to the inclined surface of the force-receiving piece 65; and an inclined strut 25 is fixed between a bottom surface of the connecting tube 23 and the inner side of a corresponding bottom tube 21.

To sum up, when the telescopic ladder needs to be folded, a foot is stepped on the downward-pressing lever 3, so that the downward-pressing lever 3 pulls the linkage rods 5 downward, and the linkage rods 5 pull the pushing vertical plates 74 downward, such that the inclined surface structures of the pressing blocks 72 exert pressures on the force-receiving pieces 65, and the horizontal components of the pressures cause the movable rods 63 to move towards the fixed sleeves 61 and compress the return springs. The movable rods 63 drive the bolts 64 to disengage from the upper insertion holes 16, so that the telescopic ladder rods 11 are sheathed in the bottom tubes 21 under the action of their own weights. When the bottommost sleeve rods of the telescopic ladder rods 11 are completely sheathed in the bottom tubes 21, the bottommost buttons 13 just press against the top surfaces of the upper transverse tubes 221, so that the locked state between the bottommost sleeve rods and the secondary bottom sleeve rods is released, and the secondary bottom sleeve rods are completely sheathed in the bottommost sleeve rods, and then the secondary bottom buttons 13 are triggered, and so on, until the automatic folding of the telescopic ladder body 1 is completed.

Figure 11:
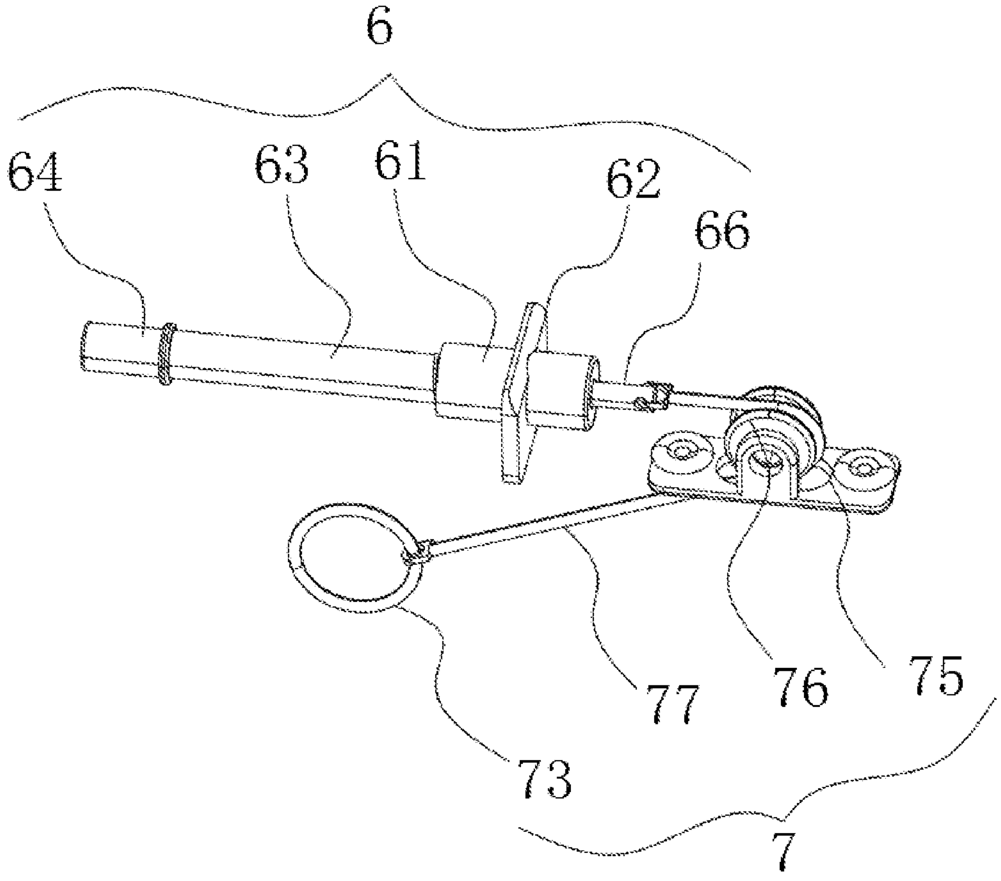
FIG. 11 is a schematic diagram of a three-dimensional structure of a locking linkage part of a third type in Embodiment I of the present invention.
Figure 12:
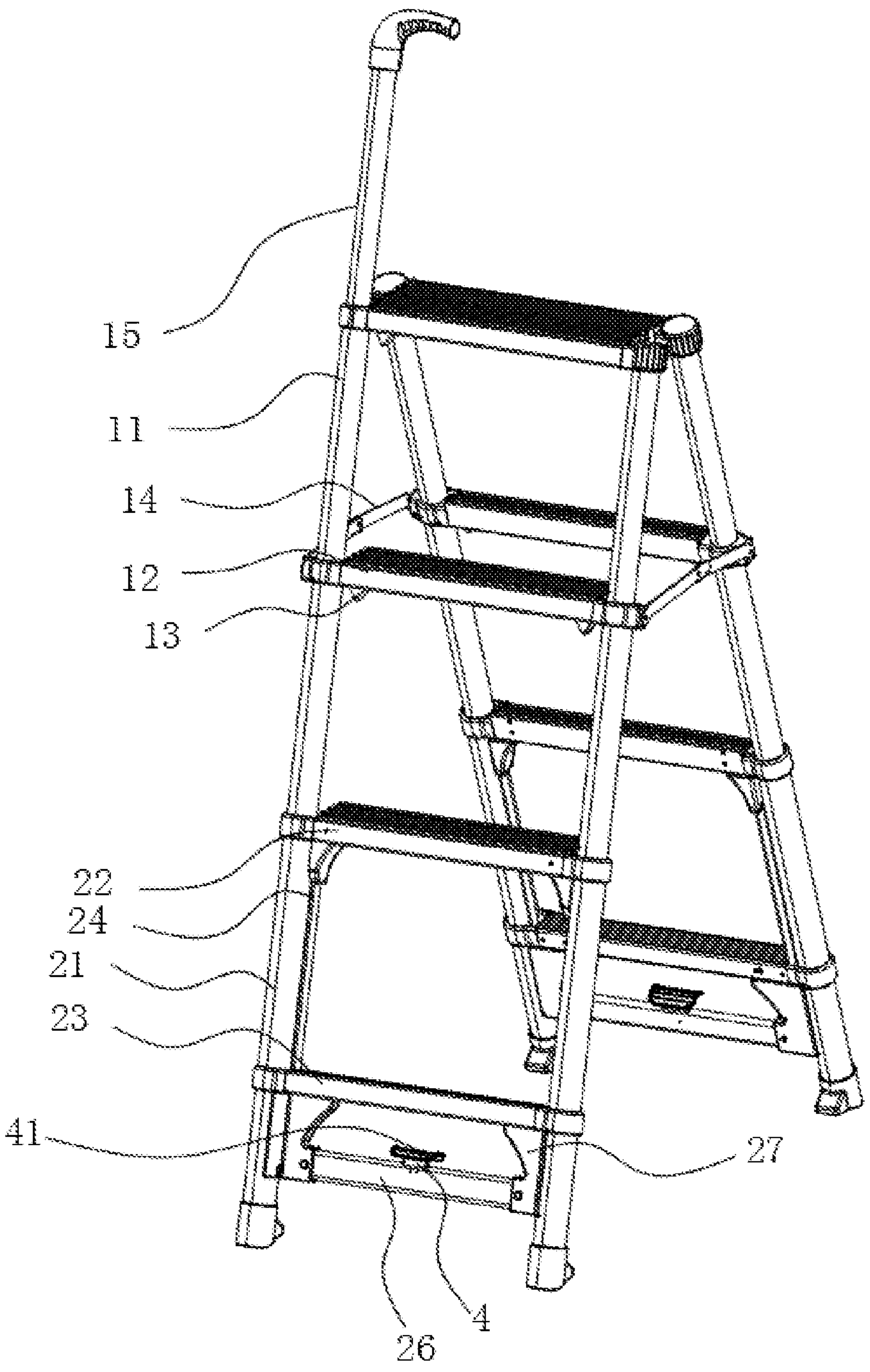
FIG. 12 is a schematic diagram of an overall three-dimensional structure in Embodiment II of the present invention.
Figure 13:
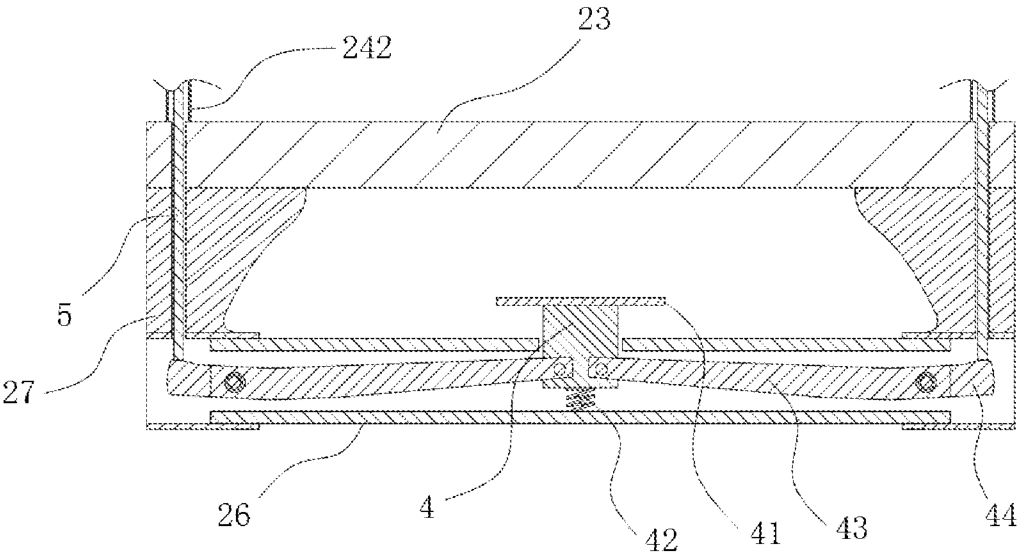
FIG. 13 is a schematic diagram of a partial cross-sectional structure of an extension part in Embodiment II of the present invention.

Further referring to FIG. 11, a third specific implementation of the locking linkage part is as follows: bottom ends of two paired linkage rods 5 penetrate through the connecting tube 23 and then are jointly fixed with a downward-pressing lever 3; a pulling pole 66 is fixedly butted at the center of an inner end face of the movable rod 63; the transmission member 7 includes a wheel seat 75 fixed to a bottom surface of the inner cavity of the upper transverse tube 221 near an end position, a fixed pulley 76 rotatably mounted on the wheel seat 75, a pulling cable 77 wound around an inner side of the fixed pulley 76 and whose top end is connected to the pulling pole 66, and a connecting ring 73 connected to a bottom end of the pulling cable 77 and connected to the top end of the linkage rod 5; and an inclined strut 25 is fixed between a bottom surface of the connecting tube 23 and the inner side of a corresponding bottom tube 21.

To sum up, when the telescopic ladder needs to be folded, a foot is stepped on the downward-pressing lever 3, so that the downward-pressing lever 3 pulls the linkage rods 5 downward, the linkage rods 5 pull the pulling cables 77 through the connecting rings 73, the pulling cables 77 form pulling forces on the pulling poles 66 through the redirection action of the fixed pulleys 76, and the pulling poles 66 move under the action of the pulling forces such that the movable rods 63 move towards the fixed sleeves 61 and compress the return springs. The movable rods 63 drive the bolts 64 to disengage from the upper insertion holes 16, so that the telescopic ladder rods 11 are sheathed in the bottom tubes 21 under the action of their own weights. When the bottommost sleeve rods of the telescopic ladder rods 11 are completely sheathed in the bottom tubes 21, the bottommost buttons 13 just press against the top surfaces of the upper transverse tubes 221, so that the locked state between the bottommost sleeve rods and the secondary bottom sleeve rods is released, and the secondary bottom sleeve rods are completely sheathed in the bottommost sleeve rods, and then the secondary bottom buttons 13 are triggered, and so on, until the automatic folding of the telescopic ladder body 1 is completed.

In Embodiment II, referring to FIGS. 1-7 and FIGS. 12-13, the present invention provides a technical solution, i.e., a fast-folding telescopic ladder, including: a telescopic ladder body 1. The telescopic ladder body 1 includes: two pairs of telescopic ladder rods 11 that are arranged in parallel and are respectively formed by a plurality of sleeve rods sheathed with each other; pedals 12 with both ends being respectively mounted at top ends of the paired sleeve rods; hinges 14 with two ends being respectively hinged to outer ends of the pedals 12; and buttons 13 provided at ends of bottom surfaces of the pedals 12 and used for releasing a locked state between corresponding sleeve rods when pressed. A top end of one of the telescopic ladder rods 11 is fixed with a handrail rod 15.

The extension part 2 includes a plurality of bottom tubes 21 that are respectively socketed and matched with bottom ends of the telescopic ladder rods 11; and a transverse connecting piece 22, two ends of which are respectively socketed and matched with top ends of the paired bottom tubes 21.

Two ends of the transverse connecting piece 22 are respectively provided with locking linkage parts radially locking the top ends of the bottom tubes 21 and the bottom ends of the telescopic ladder rods 11. The inner side of the bottom tube 21 is parallel with a linkage rod 5 whose top end is linked with the locking linkage part and whose vertical movement releases a locked state of the locking linkage part. A driving mechanism that realizes the vertical movement of the linkage rod 5 by pedaling is arranged between the bottoms of the two paired bottom tubes 21.

The inner side of the bottom end of the telescopic ladder rod 11 is provided with an upper insertion hole 16, and the inner side of the top end of the bottom tube 21 is provided with a lower insertion hole 211. The transverse connecting piece 22 includes an upper transverse tube 221 and joints 222 arranged at both ends of the upper transverse tube 221. The joint 222 includes a fixing ring 2221 fixedly sheathed on the periphery of the top end of the bottom tube 21, and an insertion block 2222 integrally formed with the fixing ring 2221 and fixedly connected to both ends of an inner cavity of the upper transverse tube 221 in an insertion manner. The peripheral wall of the fixing ring 2221 is provided with a perforation 2223 at a position corresponding to the lower insertion hole 211. The bottom surface of the insertion block 2222 is provided with a sliding groove 2224 at a position corresponding to the perforation 2223. The locking linkage part includes a transverse limiting piece 6 which is arranged in the sliding groove 2224 and the outer end of which is inserted into and matched with the perforation 2223, the lower insertion hole 211 and the upper insertion hole 16, and a transmission member 7 which is used for realizing linkage between the linkage rod 5 and the traverse limiting piece 6.

The transverse limiting piece 6 includes a fixed sleeve 61, a movable rod 63, one end of which is slidably fitted in the fixed sleeve 61, and a bolt 64 fixedly butted to the other end of the movable rod 63 and inserted into and matched with the perforation 2223, the lower insertion hole 211 and the upper insertion hole 16. A return spring is provided between the movable rod 63 and the inner cavity of the fixed sleeve 61. The fixed sleeve 61 is fixed at the inner end of the sliding groove 2224. The vertical movement of the linkage rod 5 drives the movable rod 63 to move towards the fixed sleeve 61 through the transmission member 7 and compress the return spring.

A middle part of the fixed sleeve 61 is fixedly sheathed with a retaining plate 62. A retaining slot 2225 into which the retaining plate 62 is fixedly caught is provided at a position near an outer end of the sliding groove 2224 on a bottom surface of the insertion block 2222.

The extension part 2 further includes a connecting tube 23 with two ends being respectively fixedly connected to the paired bottom tubes 21 and located below the transverse connecting piece 22 in parallel, and protective shells 24 fixed on the inner sides of the bottom tubes 21 with the top and bottom ends of the protective shells 24 being respectively connected to ends of the transverse connecting piece 22 and the connecting tube 23. The protective shells 24 include shields 241 fixed to ends of the bottom surface of the transverse connecting piece 22, and protective barrels 242 fixed to the bottoms of the shields 241 and connected to ends of the top surface of the connecting tube 23 at bottoms. Top ends of the linkage rods 5 are located in the shields 241, and parts between two ends of the linkage rods 5 are sheathed in the protective barrels 242.

In this embodiment, on the basis of the above content, there are implementations of two different specific forms of locking linkage parts that can be selected.

Figure 14:
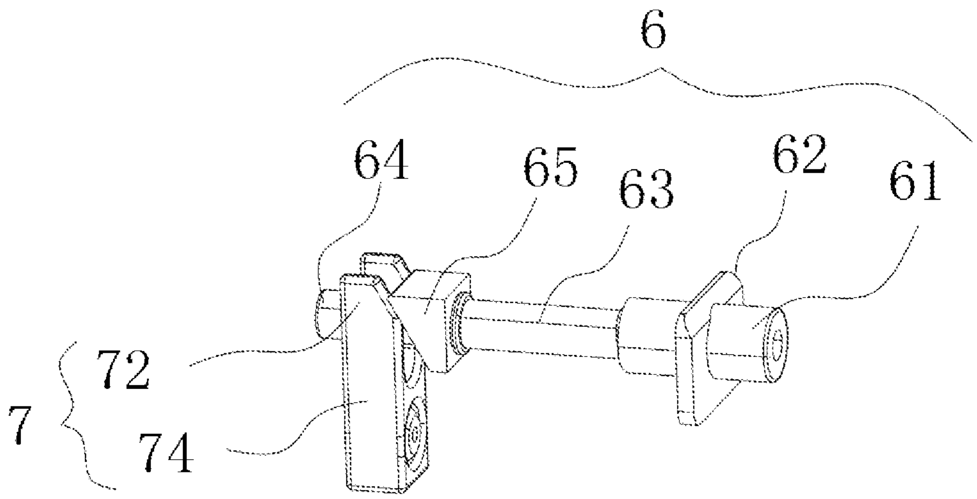
FIG. 14 is a schematic diagram of a three-dimensional structure of a locking linkage part of a first type in Embodiment II of the present invention.

Further referring to FIG. 14, the first specific implementation of the locking linkage part is as follows: end-connecting pieces 27 are respectively fixed at positions below ends of the connecting tube 23 inside the bottom tubes 21; a bottom transverse tube 26 is fixed between bottom ends of corresponding end-connecting pieces 27 in a horizontal direction; a middle part of a top surface of the bottom transverse tube 26 is vertically and slidably sleeved with a downward-pressing block 4; a force-receiving plate 41 is fixed on a top end of the downward-pressing block 4; a vertical spring 42 is connected between a bottom surface of an inner cavity of the bottom transverse tube 26 and a bottom surface of the downward-pressing block 4; two sides at the bottom of the downward-pressing block 4 are movably connected with swing rods 43, respectively; front and rear walls at outer ends of the swing rods 43 are respectively rotatably connected to front and rear walls at outer ends of the inner cavity of the bottom transverse tube 26 through rotating shafts; the linkage rods 5 are provided with bending parts at bottoms of inner cavities of the shields 241 and bottom ends of the linkage rods 5 vertically penetrate into inner cavities of the end-connecting pieces 27 at the bottoms; shifting blocks 44 are respectively fixed at positions below the bottom ends of the linkage rods 5 on outer end faces of the swing rods 43; the movable rod 63 is fixedly sheathed with a force-receiving piece 65 at a position near the bolt 64; the transmission member 7 includes a pushing vertical plate 74 whose bottom end is connected to the top end of the linkage rod 5 and whose top middle position is vertically caught with the movable rod 63, and a pressing block 72 integrally formed at a top end of the pushing vertical plate 74; the outer side of the force-receiving piece 65 is provided with an inclined surface whose normal line is inclined downward; and the pressing block 72 is provided with a corresponding inclined surface structure at a position corresponding to the inclined surface of the force-receiving piece 65.

To sum up, when the telescopic ladder needs to be folded, a foot is stepped on the force-receiving plate 41, so that the downward-pressing block 4 moves downward and compresses the vertical spring 42, such that inner ends of the swing rods 43 swing downward while the outer ends thereof swing upwards, such that the shifting blocks 44 push the linkage rods 5 upward to make the linkage rods 5 move upward; the linkage rods 5 push the pushing vertical plates 74 upward, such that the inclined surfaces of the pressing blocks 72 exert oblique upward pushing forces on the force-receiving pieces 65, and the horizontal components of the pushing forces cause the movable rods 63 to move towards the fixed sleeves 61 and compress the return springs. The movable rods 63 drive the bolts 64 to disengage from the upper insertion holes 16, so that the telescopic ladder rods 11 are sheathed in the bottom tubes 21 under the action of their own weights. When the bottommost sleeve rods of the telescopic ladder rods 11 are completely sheathed in the bottom tubes 21, the bottommost buttons 13 just press against the top surfaces of the upper transverse tubes 221, so that the locked state between the bottommost sleeve rods and the secondary bottom sleeve rods is released, and the secondary bottom sleeve rods are completely sheathed in the bottommost sleeve rods, and then the secondary bottom buttons 13 are triggered, and so on, until the automatic folding of the telescopic ladder body 1 is completed.

Figure 15:
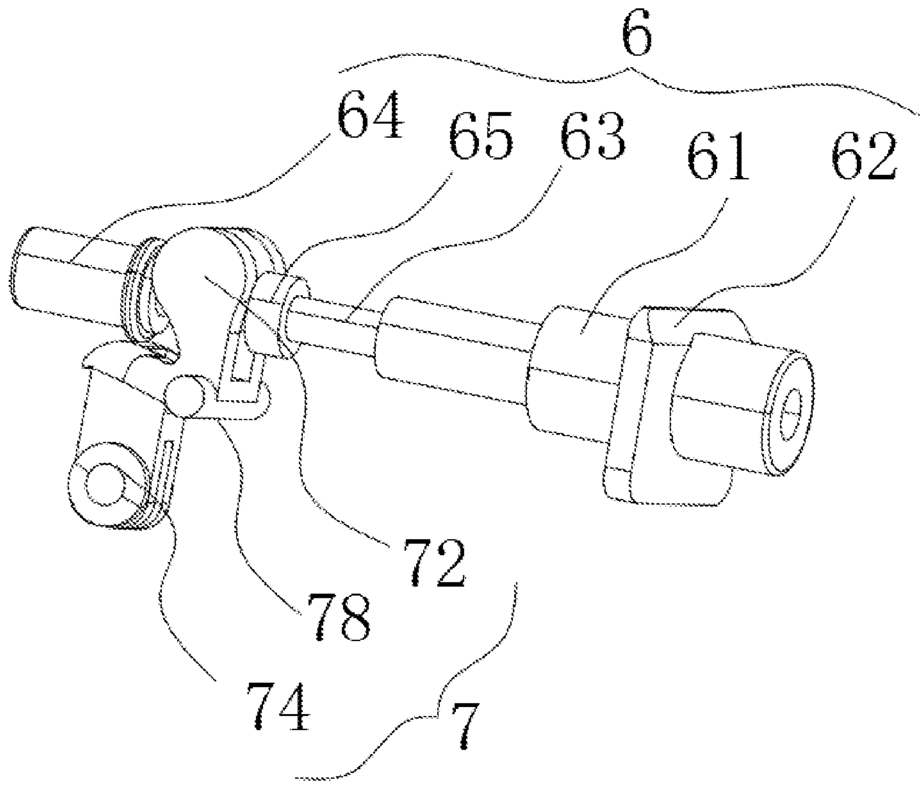
FIG. 15 is a schematic diagram of a three-dimensional structure of a locking linkage part of a second type in Embodiment II of the present invention.

Further referring to FIG. 15, the second specific implementation of the locking linkage part is as follows: end-connecting pieces 27 are respectively fixed at positions below ends of the connecting tube 23 inside the bottom tubes 21; a bottom transverse tube 26 is fixed between bottom ends of corresponding end-connecting pieces 27 in a horizontal direction; a middle part of a top surface of the bottom transverse tube 26 is vertically and slidably sleeved with a downward-pressing block 4; a force-receiving plate 41 is fixed on a top end of the downward-pressing block 4; a vertical spring 42 is connected between a bottom surface of an inner cavity of the bottom transverse tube 26 and a bottom surface of the downward-pressing block 4; two sides at the bottom of the downward-pressing block 4 are movably connected with swing rods 43, respectively; front and rear walls at outer ends of the swing rods 43 are respectively rotatably connected to front and rear walls at outer ends of the inner cavity of the bottom transverse tube 26 through rotating shafts; the linkage rods 5 are provided with bending parts at bottoms of inner cavities of the shields 241 and bottom ends of the linkage rods 5 vertically penetrate into inner cavities of the end-connecting pieces 27 at the bottoms; shifting blocks 44 are respectively fixed at positions below the bottom ends of the linkage rods 5 on outer end faces of the swing rods 43; the movable rod 63 is fixedly sheathed with a force-receiving piece 65 at a position near the bolt 64; the transmission member 7 includes a pushing vertical plate 74 whose bottom end is connected to the top end of the linkage rod 5, a rotating plate 78, an outer end of a bottom surface of which is vertically and fixedly connected to a top end of the pushing vertical plate 74, and a pressing block 72 that is fixed at an inner end of a top surface of the rotating plate 78 and whose top end is caught at a position of the movable rod 63 near an outer side of the force-receiving piece 65; and front and rear walls at inner ends of the rotating plate 78 are respectively mounted on front and rear sides of the sliding groove 2224 near the middle position through rotating shafts.

To sum up, when the telescopic ladder needs to be folded, a foot is stepped on the force-receiving plate 41, so that the downward-pressing block 4 moves downward and compresses the vertical spring 42, such that inner ends of the swing rods 43 swing downward while the outer ends thereof swing upwards, such that the shifting blocks 44 push the linkage rods 5 upward to make the linkage rods 5 move upward; the linkage rods 5 push the pushing vertical plates 74 upward to rotate the rotating plates 78, thus making the pressing blocks 72 rotating inwardly, such that the pressing blocks 72 exert pushing forces on the force-receiving pieces 65, and the pushing forces cause the movable rods 63 to move toward the fixed sleeves 61 and compress the return springs. The movable rods 63 drive the bolts 64 to disengage from the upper insertion holes 16, so that the telescopic ladder rods 11 are sheathed in the bottom tubes 21 under the action of their own weights. When the bottommost sleeve rods of the telescopic ladder rods 11 are completely sheathed in the bottom tubes 21, the bottommost buttons 13 just press against the top surfaces of the upper transverse tubes 221, so that the locked state between the bottommost sleeve rods and the secondary bottom sleeve rods is released, and the secondary bottom sleeve rods are completely sheathed in the bottommost sleeve rods, and then the secondary bottom buttons 13 are triggered, and so on, until the automatic folding of the telescopic ladder body 1 is completed.

In addition, it is worth noting that the folding process of the telescopic ladder body 1 is completed due to the pressing of the button 13, which is similar to the Chinese patent entitled "TELESCOPIC LADDER" and granted a publication No. CN203161060U, and the Chinese patent entitled "IMPROVED TELESCOPIC LADDER WITH STABLE FOLDING" and granted a publication No. CN201502312U in the prior art; and the specific forms of the locking structure and its driving structure involved in the telescopic ladder body 1 in the present invention can refer to the corresponding structures in the two patents in the prior art, which will not be repeated here.

It should be noted that, in this document, relational terms such as "first" and "second" are only used to distinguish one entity or operation from another entity or operation, and do not necessarily require or imply the existence of any such actual relationship or order between these entities or operations. Furthermore, terms "include", "contain" or any other variation thereof are intended to cover a non-exclusive inclusion, such that a process, method, article or device that includes a series of elements includes not only those elements, but also other elements not explicitly listed, or elements inherent to such process, method, article or device.

Although the embodiments of the present invention have been shown and described, it can be understood by those of ordinary skills in the art that various changes, modifications, substitutions and variations can be made to these embodiments without departing from the principles and spirit of the present invention, and the scope of the present invention is defined by the appended claims and their equivalents.

The invention claimed is:

1. A fast-folding telescopic ladder, comprising a telescopic ladder body, the telescopic ladder body comprising:

two pairs of telescopic ladder rods with each pair being arranged in parallel, wherein each telescopic ladder rod is formed by a plurality of sleeve rods that are nested within one another;

pedals with both ends being respectively mounted at top ends of paired sleeve rods;

hinges with two ends being respectively hinged to outer ends of the pedals; and buttons arranged at ends of bottom surfaces of the pedals, each button being operatively connected to a locking mechanism of a corresponding sleeve rod, the button being configured such that pressing it releases a locked state between corresponding sleeve rods when pressed, with one of the telescopic ladder rods having a handrail rod fixed at its top end;

wherein the fast-folding telescopic ladder further comprises:

an extension part, which comprises a plurality of bottom tubes that are respectively socketed and fitted with bottom ends of the telescopic ladder rods, and further comprises a transverse connecting piece, two ends of which are respectively socketed and fitted with top ends of the paired bottom tubes;

wherein the two ends of the transverse connecting piece respectively comprise locking linkage parts radially locking the top ends of the bottom tubes and the bottom ends of the telescopic ladder rods, an inner side of the bottom tube runs parallel with and abuts against a linkage rod whose top end is linked with the locking linkage part and whose vertical movement is configured to release a locked state of the locking linkage part, and a driving mechanism that realizes the vertical movement of the linkage rod by pedaling is arranged between the bottoms of the two paired bottom tubes;

wherein an inner side of the bottom end of the telescopic ladder rod comprises an upper insertion hole, and an inner side of the top end of the bottom tube comprises a lower insertion hole; wherein the transverse connecting piece comprises an upper transverse tube and joints arranged at both ends of the upper transverse tube; wherein each joint comprises a fixing ring fixedly sheathed on the periphery of the top end of the bottom tube, and an insertion block integrally formed with the fixing ring and fixedly connected to both ends of an inner cavity of the upper transverse tube in an insertion manner; wherein a peripheral wall of the fixing ring comprises a perforation at a position corresponding to the lower insertion hole, the bottom surface of the insertion block comprises a sliding groove at a position corresponding to the perforation;

wherein locking linkage part comprises: a transverse limiting piece arranged in the sliding groove, wherein an outer end of the transverse limiting piece is inserted into and fitted with the perforation, the lower insertion hole, and the upper insertion hole; and a transmission member configured for realizing linkage between the linkage rod and the traverse limiting piece.

2. The fast-folding telescopic ladder according to claim 1, wherein the transverse limiting piece comprises a fixed sleeve, a movable rod, one end of which is slidably fitted in the fixed sleeve, and a bolt fixedly butted to the other end of the movable rod and inserted into and fitted with the perforation, the lower insertion hole, and the upper insertion hole; wherein a return spring is disposed between the movable rod and an inner cavity of the fixed sleeve; the fixed sleeve is fixed at an inner end of the sliding groove; wherein the vertical movement of the linkage rod is configured to drive the movable rod to move towards the fixed sleeve through the transmission member and compress the return spring.

3. The fast-folding telescopic ladder according to claim 2, wherein a middle part of the fixed sleeve is fixedly sheathed with a retaining plate into which the retaining plate is fixedly caught is disposed at a position near an outer end of the sliding groove on a bottom surface of the insertion block.

4. The fast-folding telescopic ladder according to claim 3, wherein the extension part further comprises a connecting tube with two ends being respectively fixedly connected to the paired bottom tubes and located below the transverse connecting piece in parallel, and protective shells fixed on inner sides of the bottom tubes with top and bottom ends of the protective shells being respectively connected to ends of the transverse connecting piece and the connecting tube; the protective shells comprise shields fixed to ends of a bottom surface of the transverse connecting piece, and protective barrels fixed to the bottoms of the shields and connected to ends of a top surface of the connecting tube at bottoms; top ends of the linkage rods are located in the shields; and parts between two ends of the linkage rods are sheathed in the protective barrels.

5. The fast-folding telescopic ladder according to claim 4, wherein bottom ends of two paired linkage rods penetrate through the connecting tube and then are jointly fixed with a downward-pressing lever; the movable rod is fixedly sheathed with a force-receiving piece at a position near the bolt; the transmission member comprises a rotary retaining groove that is movably caught into the sliding groove and has front and rear walls at its outer end which are hinged, through a rotating shaft, to a position near an outer end of the sliding groove, a pressing block fixed to front and rear walls at an outer end of an inner cavity of the rotary retaining groove and movably caught at a position of the movable rod near an outer side of the force-receiving piece, and a connecting ring connected at an inner end of the rotary retaining groove and connected to the top end of the linkage rod; and an inclined strut is fixed between a bottom surface of the connecting tube and the inner side of a corresponding bottom tube.

6. The fast-folding telescopic ladder according to claim 4, wherein bottom ends of two paired linkage rods penetrate through the connecting tube and then are jointly fixed with a downward-pressing lever; the movable rod is fixedly sheathed with a force-receiving piece at a position near the bolt; the transmission member comprises a pushing vertical plate whose bottom end is connected to the top end of the linkage rod and whose top middle position is movably, connected to the movable rod in a vertical direction, and a pressing block integrally formed on front and rear sides of an inner side wall of a top end of the pushing vertical plate; an outer side of the force-receiving piece is provided with an inclined surface whose normal line is inclined upward; the pressing block is provided with a corresponding inclined surface structure at a position corresponding to the inclined surface of the force-receiving piece; and an inclined strut is fixed between a bottom surface of the connecting tube and the inner side of a corresponding bottom tube.

7. The fast-folding telescopic ladder according to claim 4, wherein bottom ends of two paired linkage rods penetrate through the connecting tube and then are jointly fixed with a downward-pressing lever; a pulling pole is fixedly butted at the center of an inner end face of the movable rod; the transmission member comprises a wheel seat fixed to a bottom surface of the inner cavity of the upper transverse tube near an end position, a fixed pulley rotatably mounted on the wheel seat, a pulling cable wound around an inner side of the fixed pulley and whose top end is connected to the pulling pole, and a connecting ring connected to a bottom end of the pulling cable and connected to the top end of the linkage rod; and an inclined strut is fixed between a bottom surface of the connecting tube and the inner side of a corresponding bottom tube.

8. The fast-folding telescopic ladder according to claim 4, wherein end-connecting pieces are respectively fixed at positions below ends of the connecting tube inside the bottom tubes; a bottom transverse tube is fixed between bottom ends of corresponding end-connecting pieces in a horizontal direction; a middle part of a top surface of the bottom transverse tube is vertically and slidably sleeved with a downward-pressing block; a force-receiving plate is fixed on a top end of the downward-pressing block; a vertical spring is connected between a bottom surface of an inner cavity of the bottom transverse tube and a bottom surface of the downward-pressing block; two sides at the bottom of the downward-pressing block are movably connected with swing rods, respectively; front and rear walls at outer ends of the swing rods are respectively rotatably connected to front and rear walls at outer ends of the inner cavity of the bottom transverse tube through rotating shafts; the linkage rods are provided with bending parts at bottoms of inner cavities of the shields and bottom ends of the linkage rods vertically penetrate into inner cavities of the end-connecting pieces at the bottoms; shifting blocks are respectively fixed at positions below the bottom ends of the linkage rods on outer end faces of the swing rods; the movable rod is fixedly sheathed with a force-receiving piece at a position near the bolt; the transmission member comprises a pushing vertical plate whose bottom end is connected to the top end of the linkage rod and whose top middle position is vertically caught with the movable rod, and a pressing block integrally formed at a top end of the pushing vertical plate; the outer side of the force-receiving piece is provided with an inclined surface whose normal line is inclined downward; and the pressing block is provided with a corresponding inclined surface structure at a position corresponding to the inclined surface of the force-receiving piece.

9. The fast-folding telescopic ladder according to claim 4, wherein end-connecting pieces are respectively fixed at positions below ends of the connecting tube inside the bottom tubes; a bottom transverse tube is fixed between bottom ends of corresponding end-connecting pieces in a horizontal direction; a middle part of a top surface of the bottom transverse tube is vertically and slidably sleeved with a downward-pressing block; a force-receiving plate is fixed on a top end of the downward-pressing block; a vertical spring is connected between a bottom surface of an inner cavity of the bottom transverse tube and a bottom surface of the downward-pressing block; two sides at the bottom of the downward-pressing block are movably connected with swing rods, respectively; front and rear walls at outer ends of the swing rods are respectively rotatably connected to front and rear walls at outer ends of an inner cavity of the bottom transverse tube through rotating shafts; the linkage rods are provided with bending parts at bottoms of inner cavities of the shields and bottom ends of the linkage rods vertically penetrate into inner cavities of the end-connecting pieces at the bottoms; shifting blocks are respectively fixed at positions below the bottom ends of the linkage rods on outer end faces of the swing rods; the movable rod is fixedly sheathed with a force-receiving piece at a position near the bolt; the transmission member comprises a pushing vertical plate whose bottom end is connected to the top end of the linkage rod, a rotating plate, an outer end of a bottom surface of which is vertically and fixedly connected to a top end of the pushing vertical plate, and a pressing block that is fixed at an inner end of a top surface of the rotating plate and whose top end is caught at a position of the movable rod near an outer side of the force-receiving piece; and front and rear walls at inner ends of the rotating plate are respectively mounted on front and rear sides of the sliding groove near the middle position through rotating shafts.

10. The fast-folding telescopic ladder according to claim 4, wherein the handrail rod is an extension portion of the corresponding telescopic ladder rod, and wherein the handrail rod and the corresponding telescopic ladder rod are substantially located on a same straight line.

11. The fast-folding telescopic ladder according to claim 4, wherein a free end of the handrail rod comprises a curved hook.

* * * * *